US005467440A

United States Patent [19]

Nihei

[11] Patent Number: 5,467,440

[45] Date of Patent: Nov. 14, 1995

[54] ORGANIZATION CHART IMAGE PRINT METHOD

[75] Inventor: Tomoyuki Nihei, Iruma, Japan

[73] Assignee: Casio Computer Co., Ltd., Tokyo, Japan

[21] Appl. No.: 272,421

[22] Filed: Jul. 8, 1994

[30] Foreign Application Priority Data

Jul. 12, 1993 [JP] Japan .................................... 5-171879

[51] Int. Cl.$^{6}$ .................................................... G06F 15/20

[52] U.S. Cl. ............................................................ 395/133

[58] Field of Search .................................... 395/133, 140, 395/155, 161, 160; 345/119, 120

[56] References Cited

U.S. PATENT DOCUMENTS

| | | | |
|---|---|---|---|
| 4,945,499 | 7/1990 | Asari et al. | 364/521 |
| 5,119,477 | 6/1992 | Ebbers | 395/160 |
| 5,295,244 | 3/1994 | Dev et al. | 395/161 |

*Primary Examiner*—Phu K. Nguyen

*Attorney, Agent, or Firm*—Frishauf, Holtz, Goodman, Langer & Chick

[57] ABSTRACT

A data edit unit creates an employee master file and a position table file. An intra-block arrangement definition table is created via a data input unit. An intermediate table creation unit creates an intermediate table by looking up the employee master file and a position table in the position table file, and stores the intermediate table in an intermediate table file. A hierarchical block development unit creates print image data of an organization chart in which print image data of respective blocks are arranged at corresponding hierarchical positions, in a hierarchical image memory by looking up the intermediate table and the intra-block arrangement definition table. A print image development unit connects the blocks by ruled lines in accordance with the hierarchy connection relationship by looking up the intermediate table, thus completing print image data of an organization chart. The organization chart is printed out via a print unit.

3 Claims, 13 Drawing Sheets

1 EMPLOYEE MASTER FILE

| 101 EMPLOYEE NUMBER | 102 NAME | 103 POSITION CODE | 104 TITLE NAME |
|---|---|---|---|
| 1012 | A | 1001 | DIVISION MANAGER |
| 2002 | B | 1020 | DEPARTMENT MANAGER |
| 2345 | C | 1040 | OFFICE MANAGER |
| 3041 | D | 1060 | OFFICE MANAGER |
| 3123 | E | 1100 | OFFICE MANAGER |
| 3155 | F | 1020 | |
| 3456 | G | 1040 | SECTION CHIEF |
| 3567 | H | 1040 | |
| 3678 | I | 1060 | |
| 3985 | J | 1100 | |

FIG.2

20 POSITION TABLE

| | 201 POSITION CODE | 202 POSITION NAME | 203 HOST POSITION CODE | 204 HIERARCHICAL LEVEL NUMBER | 205 SUPERIOR'S EMPLOYEE NUMBER | 206 NUMBER OF INFERIORS |
|---|---|---|---|---|---|---|
| 2001 | 1001 | WORDPROCESSOR DEVISION | | 1 | 1012 | 10 |
| 2002 | 1020 | ENGINEERING DEPARTMENT | 1001 | 2 | 2002 | 7 |
| 2003 | 1100 | PLANNING OFFICE | 1001 | 3 | 3123 | 2 |
| 2004 | 1040 | FIRST ENGINEERING OFFICE | 1020 | 3 | 2345 | 3 |
| 2005 | 1060 | SECOND ENGINEERING OFFICE | 1020 | 3 | 3041 | 2 |

FIG.3

7 INTER-BLOCK ARRANGEMENT DEFINITION TABLE

| BLOCK NAME AREA | POSITION NAME |
|---|---|
| AUXILIARY NAME AREA 1 | |
| AUXILIARY NAME AREA 2 | NUMBER OF INFERIORS |
| AUXILIARY NAME AREA 3 | |
| AUXILIARY NAME AREA 4 | |
| AUXILIARY NAME AREA 5 | TITLE NAME |
| AUXILIARY NAME AREA 6 | NAME |

FIG.7

16 INTERMEDIATE TABLE

| | HIERARCHICAL LEVEL NUMBER | HIGER HIERARCHICAL LEVEL | POSITION NAME | SUPERIOR'S TITLE | SUPERIOR'S NAME | NUMBER OF INFERIORS | INFERIOR'S TITLE | INFERIOR'S NAME | |
|---|---|---|---|---|---|---|---|---|---|
| 1601 | | | WORDPROCESSOR DIVISION | DIVISION MANAGER | A | 10 | | | BLOCK A |
| 1602 | 2 | 1 | ENGINEERING DEPARTMENT | DEPARTMENT MANAGER | B | 7 | | | BLOCK B |
| 1603 | | | | | | | | F | |
| 1604 | 3 | 2 | FIRST ENGINEERING OFFICE | OFFICE MANAGER | C | 3 | | | BLOCK C |
| 1605 | | | | | | | SECTION CHIEF | G | |
| 1606 | | | | | | | | H | |
| 1607 | 3 | 2 | SECOND ENGINEERING OFFICE | OFFICE MANAGER | D | 2 | | | BLOCK D |
| 1608 | | | | | | | | I | |
| 1609 | 3 | 1 | PLANNING OFFICE | OFFICE MANAGER | E | 2 | | | BLOCK E |
| 1610 | | | | | | | | J | |
| | 161 | 162 | 163 | 164 | 165 | 166 | 167 | 168 | |

FIG.9

ORGANIZATION CHART IMAGE PRINT METHOD

BACKGROUND OF THE INVENTION

1. Field of the Invention

The present invention relates to an image print method for automatically printing an organization chart image on the basis of various kinds of pre-stored data.

2. Description of the Related Art

For example, in various kinds of organizations such as companies, public service organizations, schools, and the like, their organization charts are often utilized. Especially, in the personnel department and the general affairs department, every time personnel changes or organization changes occur, the organization chart must be corrected or created.

Conventionally, such an organization chart is normally created using an office computer, personal computer, wordprocessor, or the like. More specifically, in these computers, the organization chart is created while running application software programs such as a wordprocessor program, a drawing tool, and the like.

However, in this case, the organization chart is manually created with reference to personnel data such as an "employee master file", a "position table" which records departments to which employees belong, and the like.

As described above, conventionally, when an organization chart is created even using a wordprocessor, a computer, or the like, such a creating operation normally depends on manual operations, i.e., key inputs, and the like. For this reason, the creation efficiency is poor, and the operation is time-consuming.

when personnel changes or organization changes occur, the contents of the above-mentioned file and table must be updated, and an organization chart must be created or corrected based on the updated contents of these file and table, resulting in a considerably heavy load.

These problems apply not only to the organization chart but also to hierarchical charts of all organized data sets which can be expressed hierarchical charts, such as a hierarchical relation chart of modules, hierarchical directories of files, and the like in specifications of software.

SUMMARY OF THE INVENTION

It is the first object of the present invention to provide an organization chart image print method, which can automatically print an organization chart image on the basis of various kinds of pre-stored data.

In order to achieve the above object, according to the present invention, there is provided a method for printing out an organization chart image on the basis of a data file and a position table, comprising the steps of: storing a plurality of data in the data file, and storing a position code in correspondence with each of the stored data; storing a plurality of position codes in the position table, and storing a higher-level connection code indicating a connection to a higher-level connection code and a hierarchical level number indicating a higher hierarchical level in correspondence with each of the position codes; classifying the data stored in the data file into blocks in units of corresponding position codes; generating a position name indicating the position code of a block of interest and data included in the block as a block image for each of the classified blocks; arranging the block image generated for each of the classified blocks in a hierarchical area corresponding to the hierarchical level number of the block when the block image is developed in an image memory which is divided into a plurality of hierarchical areas, and arranging blocks having the common higher-level connection code at neighboring positions upon arrangement of the block images correcting the arrangement position of the block image arranged in the higher-level hierarchical area of the blocks which have the common higher-level connection code and are arranged at the neighboring positions, so that the block image in the higher-level hierarchical area is arranged at a middle position between the block images of the blocks having the common higher-level connection code; and connecting the hierarchical levels of block images arranged in the corresponding hierarchical areas in the image memory by connection line images, and printing out an image obtained by connecting the block images connected by the connection line images as an organization chart image.

Since a hierarchical chart is automatically created on the basis of a file and table which are created in advance, the load upon creation of a hierarchical chart such as an organization chart in, e.g., a personnel job, can be greatly reduced, and high-speed creation can be assured. Also, data can be changed quickly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE INVENTION

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a table showing the format of an employee master file;

FIG. 3 is a table showing the format of a position table;

FIG. 7 is a table showing the format of an intrablock arrangement definition table and its setting example;

FIG. 9 is a table showing an example of an intermediate table;

DETAILED DESCRIPTION OF THE PREFERRED EMBODIMENT

The preferred embodiment of the present invention will be described hereinafter with reference to the accompanying drawings.

Figure 1:
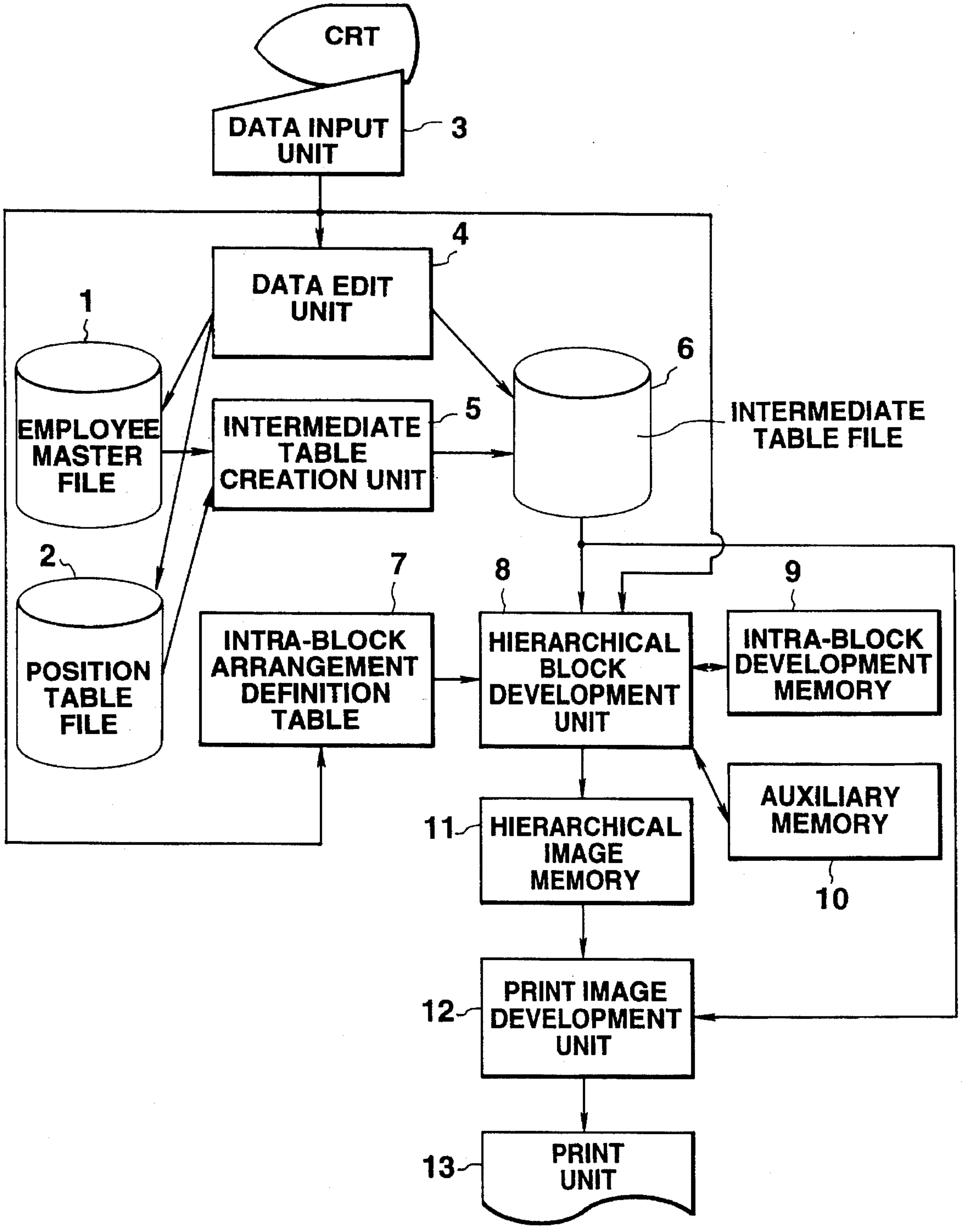
FIG. 1 is a block diagram showing the arrangement of a system according to an embodiment of the present invention.

FIG. 1 is a block diagram showing the system arrangement of an automatic organization chart creation apparatus according to an embodiment of the present invention.

Referring to FIG. 1, an employee master file 1 is a file which stores, as key items, data such as the names, position codes, titles, and the like of employees of a company.

A position table file 2 is a file for storing a position table 20 which is set with data such as the hierarchical connection relationship among different units of the company such as the division, departments, offices, and the like, hierarchical level numbers indicating the hierarchical positions (hierarchical levels) of the division, departments, offices, and the like, superior's employee numbers, the numbers of inferiors belonging to these respective units, and the like.

A data input unit 3 comprises, e.g., a keyboard, a CRT display, and the like, and serves as an input device with which a user inputs data to be registered in the employee master file 1 and the position table 20, and data to be set in an intra-block arrangement definition table 7 (to be described later).

A data edit unit 4 creates records of the employee master file 1 on the basis of data input by a user via the data input unit 3. The data edit unit 4 also creates the position data on the basis of the input data, and writes it in the position table file 2.

An intermediate table creation unit 5 creates an intermediate table 16 as basic information used for creating image data of an organization chart with reference to the employee master file 1 and the position table 20. The intermediate table 16 will be described in detail later.

An intermediate table file 6 is a file for storing the intermediate table 16 created by the intermediate table creation unit 5.

The intra-block arrangement definition table 7 is a table for defining a print image of the division, departments, offices, and the like (blocks) in the organization chart to be created and output according to this embodiment. The definition information is set in the table 7 based on data input by a user using the data input unit 3.

A hierarchical block development unit 8 creates hierarchical image data of the organization chart on the basis of the contents of the intermediate table 16 and the intra-block arrangement definition table 7. The hierarchical image data is divided into a plurality of blocks, as will be described later, and in each of these blocks, print image data of one unit of the company is written in principle.

An intra-block development memory 9 is a memory used when the hierarchical block development unit 8 creates the hierarchical image data in units of blocks, and stores print image data for one block in the form of bit map data.

An auxiliary memory 10 is a memory used for temporarily saving image data already developed on a hierarchical image memory 11 (to be described later) when the hierarchical block development unit 8 creates the hierarchical image data. The auxiliary memory 10 is used for printing out all blocks belonging to a certain group onto the next page, as will be described later.

The hierarchical image memory 11 is a page memory (frame memory) for storing hierarchical image data for one page of the organization chart created by the hierarchical block development unit 8 in the form of bit map data.

A print image development unit 12 reads out hierarchical image data of the organization chart from the hierarchical image memory 11, and connects block image data by ruled lines with reference to the intermediate table stored in the intermediate table file 6, thus completing hierarchical image data of the organization chart. The unit 12 then outputs the completed image data to a print unit 13 in units of pages.

The print unit 13 comprises a page printer such as an LED printer, a laser printer, or the like, and prints out, in units of pages, the hierarchically expressed organization chart on the basis of bit map image data of hierarchical data of the organization chart input from the print image development unit 13.

In this embodiment, a flag 207 called a projecting flag is prepared as one of items of the intermediate table, and can be set by the user via the data input unit 3 and the data edit unit 4. When the projecting flag 207 is set, a certain unit (block) can be printed out at a specific hierarchical position.

In the above arrangement, processing operations of the data edit unit 4, the intermediate table creation unit 5, the hierarchical block development unit 8, and the print image development unit 12 are realized by, e.g., executing a program loaded on a main memory by a CPU.

The intra-block arrangement definition table 7, the intra-block development memory 9, and the auxiliary memory 10 are allocated on, e.g., the main memory.

Furthermore, the employee master file 1, the position table file 2, and the intermediate table file 6 are created on, e.g., a magnetic disk, a magnetooptical disk, or the like.

FIG. 2 shows the format of the employee master file 1.

One record of the employee master file 1 consists of four items, i.e., an employee number 101, a name 102, a position code 103, and a title name 104. The employee number 101 is the identification number of an employee, which is defined by a number of four figures. The position code 103 is the identification number of the employee's position, which is similarly defined by a number of four figures. In this manner, in the employee master file 1, the name, position (position code), and title name are registered for each employee.

FIG. 3 shows the format of the position table 20.

One row (record) of this table 20 consists of a position code 201, a position name 202, a higher-level position code 203, a hierarchical level number 204, a superior's employee number 205, and the number of inferiors 206.

The position code 201 is the same as the position code 103, and is a number of four figures, which is individually assigned to each unit.

The position name 202 is a character string representing the name of each unit.

The higher-level position code 203 is the position code 103 of a unit corresponding to a hierarchical level higher by one than that of a unit having the position name 202.

The hierarchical level number 204 is a number indicating the hierarchical position of a unit having the position name 202. The number of the highest hierarchical level is "1", and is incremented by "1" in turn like "2", "3", . . . as the hierarchical level is lowered.

The superlot's employee number 205 is the employee number 101 of a superior in charge of a unit having the position name 202.

The number of inferiors 206 is the number of employees belonging to a unit having the position name 202.

In this manner, in the position table 20, the hierarchical position of a unit having the position name 202 is defined by the hierarchical level number 204. Also, a superior in charge of a unit having the position name 202 is registered by the superior's employee number 205. Furthermore, the number of employees in a unit having the position name 202 is registered by the number of inferiors 206. As information representing the hierarchical relationship between units having the position names 202, which is important information in this embodiment, the position code 203 is registered.

In an example shown in FIG. 3, for example, since the higher-level position codes 203 of both an engineering department and a planning office are "1001", it is registered that a wordprocessor division having the position code 201 of "1001" is an immediately higher-level unit of these units. Similarly, it is registered that first and second engineering offices are lower-level units of the engineering department.

Figure 4:
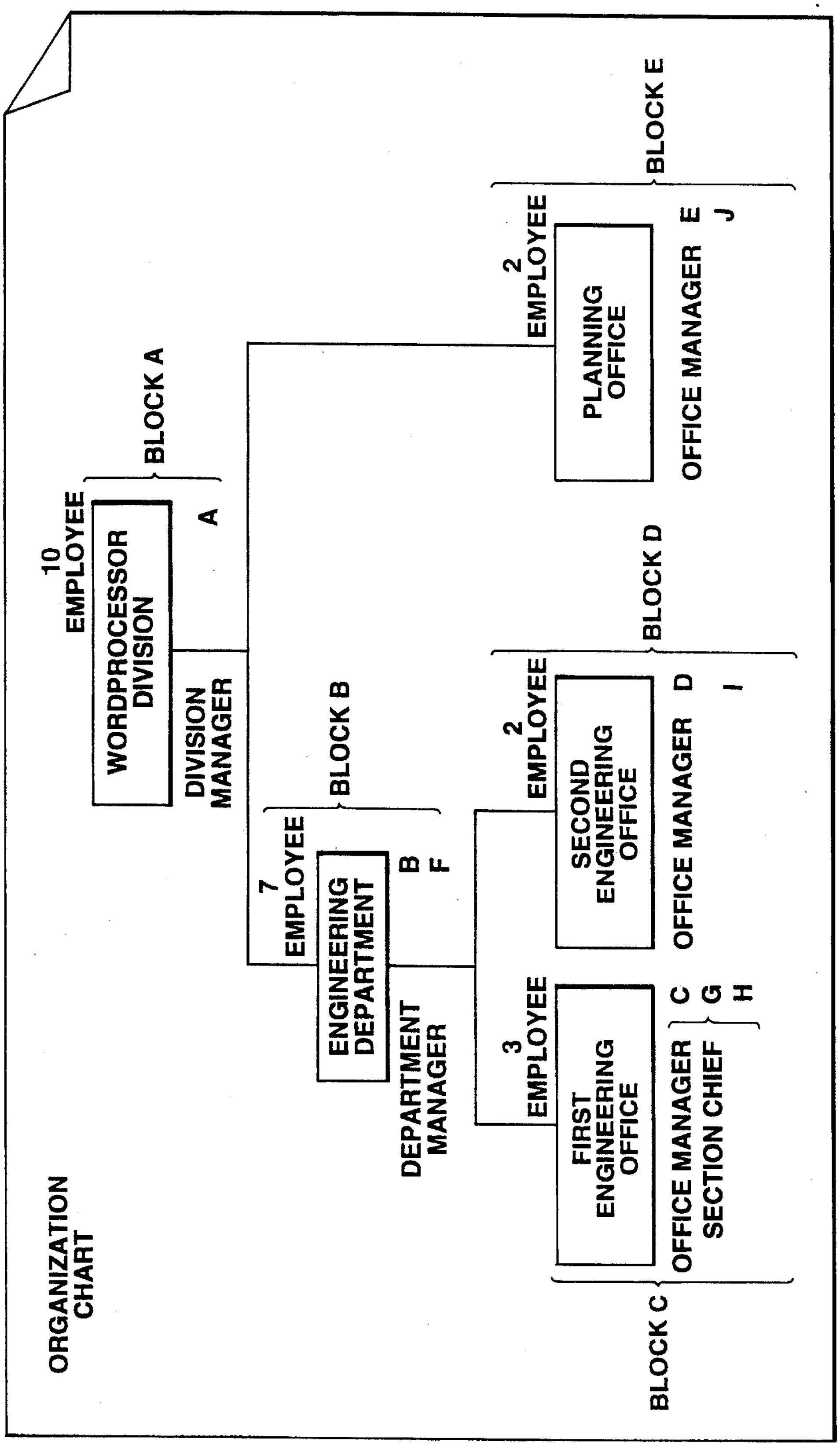
FIG. 4 is a view showing an example of an organization chart.

In this embodiment, an organization chart shown in FIG. 4 is automatically created and output on the basis of the employee master file 1, the position table 20, and the intra-block arrangement definition table 7 (whose contents will be described in detail later).

Figure 5:
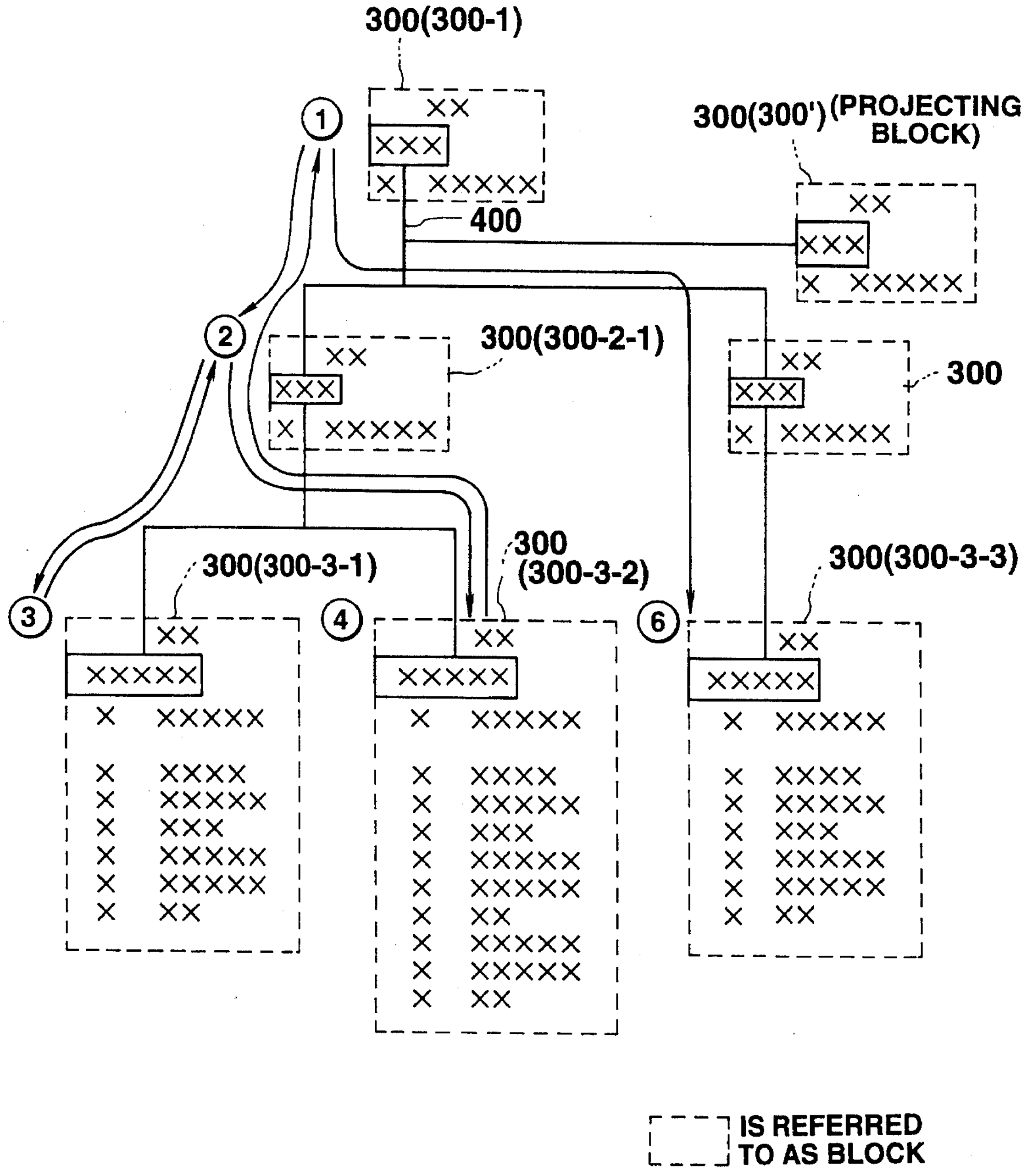
FIG. 5 is a view for explaining the format of an organization chart to be printed out according to the embodiment shown in FIG. 1.

FIG. 5 shows the format of the organization chart to be printed out according to this embodiment.

As shown in FIG. 5, the organization chart consists of a plurality of blocks 300 indicated by broken lines in FIG. 5, and ruled lines 400 connecting the blocks 300. Each block 300 corresponds to one unit such as the division, departments, offices, and the like.

Figure 6:
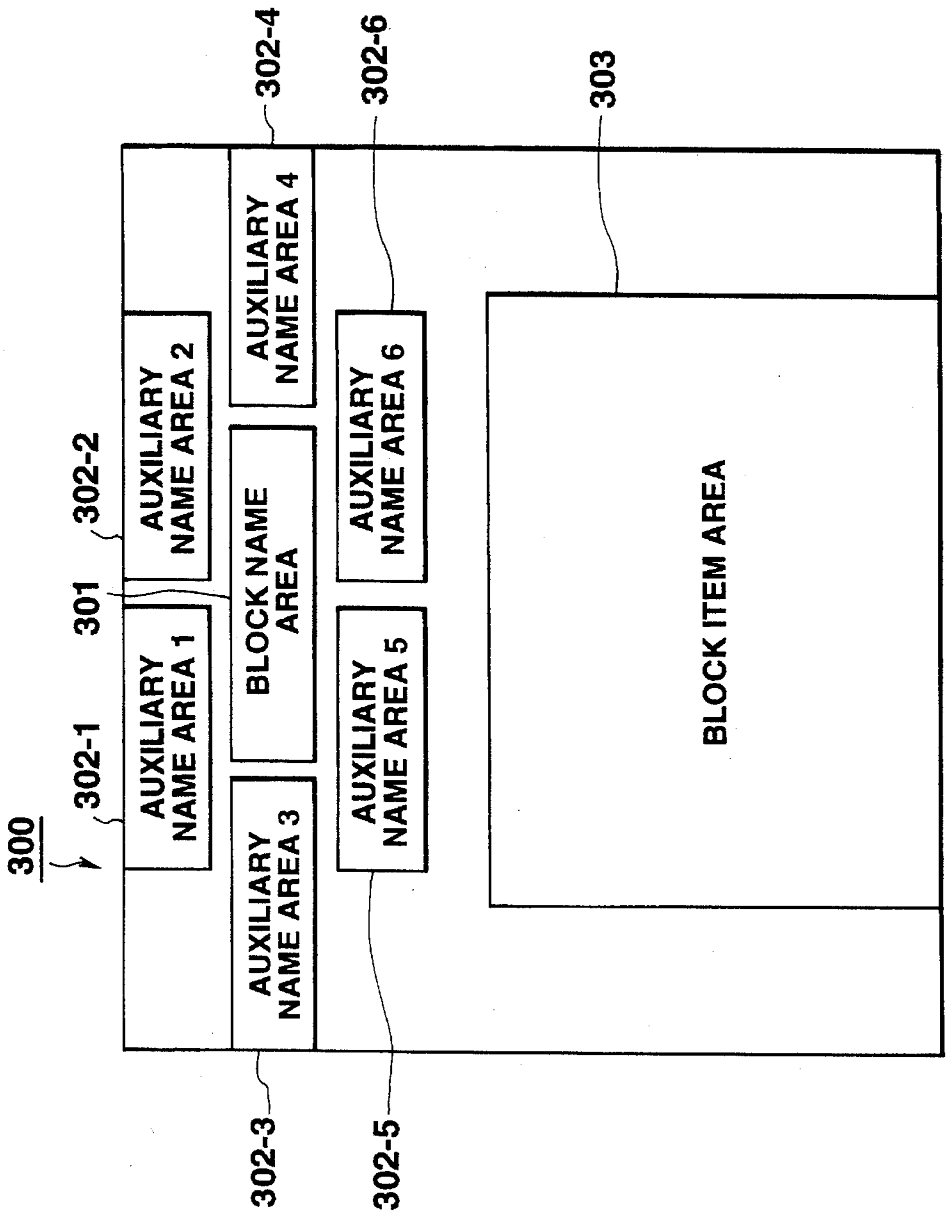
FIG. 6 is a view for explaining the format of a block.

FIG. 6 shows the internal arrangement of each block 300.

As shown in FIG. 6, the block 300 consists of a block name area 301 located at an upper central portion, six auxiliary name areas 302-1 to 302-6 arranged around the block name area 301, and a block item area 303 arranged below these areas.

Of these areas, contents printed in areas other than the block item area 303 are determined by the contents set in the intra-block arrangement definition table 7 by the user.

FIG. 7 shows the format of the intra-block arrangement definition table 7.

As shown in FIG. 7, the number of items to be set in the table 7 is seven, i.e., the block name area 301 and the auxiliary name areas 302-1 to 302-6.

In an example shown in FIG. 7, designation is made so that the position name 202 is printed out on the block name area 301, the number of inferiors 206 is printed out on the auxiliary name area 302-2, the title name 104 is printed out on the auxiliary name area 302-5, and the name 102 is printed out on the auxiliary name area 302-6.

In this manner, in each item of the intra-block arrangement definition table 7, one of record items of the employee master file 1 or the position table 20 is selected and set. This setting operation is performed by the user via the data input unit 3.

On the other hand, print data in the block item area 303 in the block 300 is set by the hierarchical block development unit 8 with reference to items set in the auxiliary name areas

302-5 and 302-6. More specifically, all data corresponding to the items set in the auxiliary name areas 302-5 and 302-6 are simultaneously printed on the block item area 303.

Image data of the block 300 shown in FIG. 6 is written in the block development memory 9 by the hierarchical block development unit 8.

Figure 8:
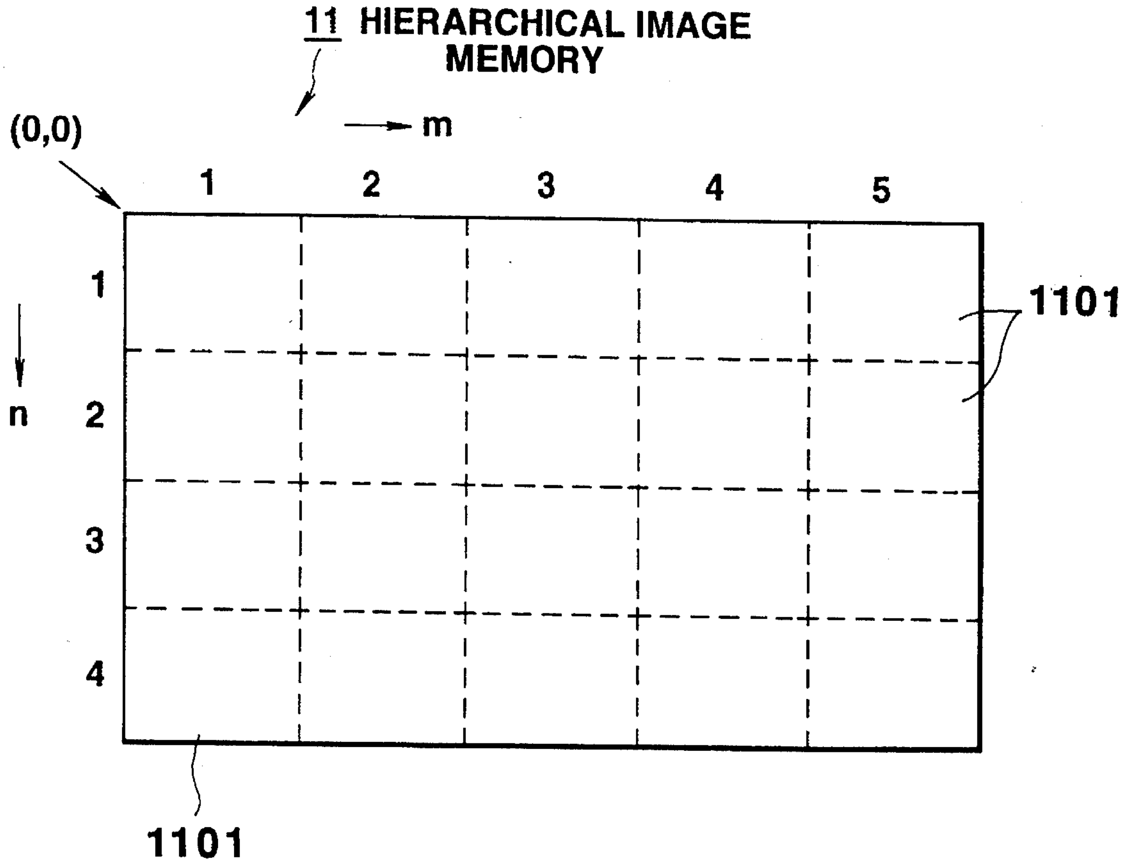
FIG. 8 is a view showing the internal arrangement of a hierarchical image memory.

FIG. 8 shows the internal arrangement of the hierarchical image memory 11.

Referring to FIG. 8, one rectangle 1101 divided by broken lines corresponds to an area for storing the entire image data of the block 300 shown in FIG. 6 (except for a projecting block 300' and a centered and re-arranged block 300, as will be described later). The hierarchical image memory 11 stores image data for one page of the organization chart in the form of a print image as it is. More specifically, when the position (address) of each rectangle 1101 shown in FIG. 8 is expressed by coordinates (row, column) having the upper left corner of the memory 11 as the origin (0, 0), a rectangle 1101 located at (1, m) (m=1, 2 , . . . 5) corresponds to the highest hierarchical level (first hierarchical level), and the hierarchical level is lowered in the order of (2, m), (3, m), and (4, m) (respectively corresponding to the second, third, and fourth hierarchical levels). In an example shown in FIG. 8, image data for four hierarchical levels (five blocks per hierarchical level) can be written. In this embodiment, a unit at a specific hierarchical position can be printed out as a projecting block 300' shown in FIG. 5 at a middle position between adjacent hierarchical levels. In this case, image data of the projecting block 300' is written astride the two rectangles 1101.

FIG. 9 shows the first example of the format of the intermediate table 16 created by the intermediate table creation unit 5 and stored in the intermediate table file 6.

As shown in FIG. 9, the intermediate table 16 consists of 8 items, i.e., a hierarchical level number 161, a higher hierarchical level 162, a position name 163, a superior's title name 164, a superior's name 165, the number of inferiors 166, an inferior's title 167, and an inferior's name 168. This table 16 stores all kinds of information required when the hierarchical block development unit 8 creates image data of the organization chart.

The operation of this embodiment with the above-mentioned arrangement will be described below.

Figure 10:
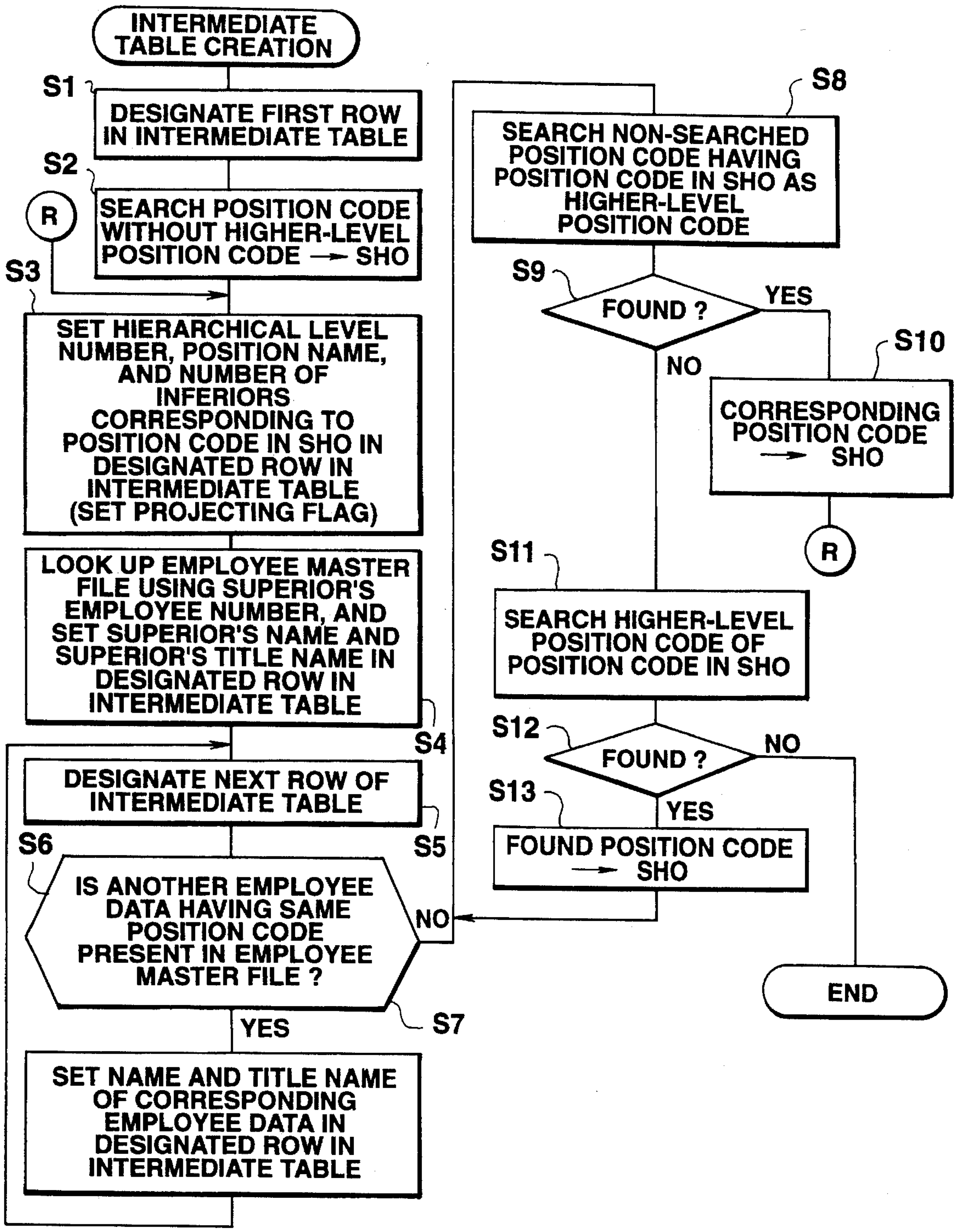
FIG. 10 is a flow chart for explaining intermediate table creation processing to be executed by an intermediate table creation unit.

FIG. 10 is a flow chart for explaining the operation of intermediate table creation processing to be executed by the intermediate table creation unit 5.

In this processing, a pointer i indicating the row position of the intermediate table 16 is set to be "1" (first row) (S1).

Then, the item columns of the higher-level position code 203 in the position table 20 (see FIG. 3) are looked up to search for the position code 201 corresponding to a blank column of the higher-level position code 203, i.e., a row (to be referred to as a record hereinafter) where no higher-level position code is set. The position code 201 of the searched recorded is set in a register SHO (S2).

Subsequently, the hierarchical level number 204, the position name 202, and the number of inferiors 206 are read out from the record (in this case, a record 2001) in the position table 20, which record has the position code 201 set in the register SHO, and the readout data are set in the corresponding item columns in a row indicated by the pointer i in the intermediate table 16 (S3).

With the above-mentioned operation, in the first row 1601 in the intermediate table 16, "1" is set in the column of the hierarchical level number 161, "wordprocessor division" is set in the column of the position name 163, and "10" is set in the number of inferiors 166, as shown in FIG. 9.

The employee master file 1, in turn, is searched using the superior's employee number of this record (in this case, the record 2001) to read out the superior's name 102 and title name 104 from a record (in this case, a record 1001) having the superior's employee number 205. The readout data are set in the item columns of the superior's name 165 and the superior's title name 164 in a row (in this case, the first row) indicated by the pointer i in the intermediate table 16 (S4).

With this operation, "division manager" and "A" are respectively set in the items of the superior's title name 164 and the superior's name 165, thus completing creation of the first row.

Subsequently, the pointer i is set at the next row (in this case, the second row) in the intermediate table 16 (S5), and it is checked if employee data (corresponding record) having the same position code as the position code (in this case, "1001") set in the register SHO is present in the employee master file 1 (S6).

In this case, since such data is not present (NO in step S6), the position table 20 is searched to check if a non-searched record in which the same code as the position code ((in this case, "1001") set in the register SHO is set in the higher-level position code 203 is present in the position table 20 (S8). More specifically, records in the position table 20 are searched in turn from the head record.

If the corresponding record is found (YES in step S8), the position code 201 of the found record is set in the register SHO (S10).

With this processing, the position code (=1020) in a record 2002 in the position table 20 is set in the register SHO.

Subsequently, the flow returns to step S3 to execute the above-mentioned processing in step S3 for a record which has the position code, set in the register SHO, in the position table 20, i.e., the record (in this case, the record 2002) found in step S8.

With this processing, as shown in FIG. 9, in the second row in the intermediate table 16, "2" is set in the column of the hierarchical level number 161, "engineering department" is set in the column of the position name 163, and "7" is set in the number of inferiors 166.

The flow then advances to step S4 to search the employee master file 1 using the superior's employee number 205 (in this case, "2002") of the record (in this case, the record 2002) in the position table 20 found in step S3, thereby setting the name 102 and the title name 104 of a record (in this case, a record 1002) found by the above-mentioned searching operation in the item columns of the superior's name 165 and the superior's title name 164 in the row (in this case, the second row) indicated by the pointer i in the intermediate table 16.

With this operation, as shown in FIG. 9, "department manager" and "B" are respectively set in the item columns of the superior's title name 164 and the superior's name 165 in the second row 1602 in the intermediate table 16, thus completing creation of the second row 1602 in the intermediate table 16.

Subsequently, the flow advances to step S5 to set the pointer i at the next row (in this case, the third row 1603) in the intermediate table 16. Thereafter, in step S6, it is checked if employee data (corresponding record) having the same position code 103 as that set in the register SHO is present in the employee master file 1. If such data is present (YES in step S6), the name 102 and the title 104 (ignored if the corresponding column is blank) of the employee data are set in the row indicated by the pointer i in the intermediate table 16 (S7).

With this operation, as shown in FIG. 9, "F" is set in the column of the inferior's name 168 in the third row 1603 in the intermediate table 16, thus completing creation of the third row 1603.

The flow returns to step S5 again to set the pointer i at the next row (in this case, the fourth row) in the intermediate table 16, and it is then checked in step S6 if employee data having the same position code 103 as that set in the register SHO is present in the employee master file 1. In this case, since there is no employee data having the position code "1020" (NO in step S6), it is checked by looking up the position table 20 if a non-searched position code 201 which has the position code (in this case, "1020") set in the register SHO as the higher-level position code is present (S8).

In this case, since a record 2004 corresponds to the record in question (YES in step S9), "1040" as the position code 201 of this record 2004 is set in the register SHO (S10).

Steps S3 to S7 above are repeated on the basis of the position code "1040" set in the register SHO.

With the processing in steps S3 and S4, as shown in FIG. 9, data associated with the entire first engineering office and its office manager are set in the fourth row 1604 in the intermediate table 16. Then, the processing in steps S5 to S7 is repeated twice, and as shown in FIG. 9, data of a section chief G and an employee H are respectively set in the fifth and sixth rows 1605 and 1606 in the intermediate table 16.

The flow then advances again to step S8 to check if a record which as the position code (in this case, "1040") set in the register SHO as the higher-level position code 203 is present in the position table 20.

In this case, since such a record is not present in the position table 20, the position table 20 is searched to check if the higher-level position code 203 of the position code (in this case, "1040") set in the register SHO is present (S11).

If such a code is found (YES in step S12), the found position code 203 is set in the register SHO (S13).

With this processing, a position code (="1020") registered in the higher-level position code in the record 2004 in the position table 20 is set in the register SHO.

Subsequently, the flow returns to step S8 to search the position table 20, thereby finding a non-searched position code (="1060") which has the position code (in this case, "1020") set in the register SHO as the higher-level position code 203 from the record 2005 (YES in step S9). The found position code ("1060") is set in the register SHO (S10).

The processing in steps S3 to S7 is performed again on the basis of the position code (="1060") set in the register SHO.

Thus, the same processing as the processing (data creation of the fourth to sixth rows 1604 to 1606 in the intermediate table 16) executed for the first engineering office having the position code "1040" is executed, and data associated with the second engineering office are set in the seventh and eighth rows 1607 and 1608 in the intermediate table 16, as shown in FIG. 9.

The flow returns to step S8 again to check if a non-searched position code 201 which has the position code (="1020") currently set in the register SHO as the higher-level position code 203 is present in the position table 20.

In this case, since such a non-searched position code is not present (NO in step S9), the position code (="1020") is detected from the position table 20 in step S11 (YES in step S12), and the detected position code (="1001") is set in the register SHO (S13).

The flow returns to step S8 again to find out a non-searched position code 201 (="1100") which has the position code (="1001") set in the register SHO as the higher-level position code 203 from the position table file 2 (YES in step S9), and the found position code 201 (="1100") is set in the register SHO (S10).

The processing in steps S3 to S7 is executed again on the basis of the position code 201 (="1100") set in the register SHO, and data associated with the planning office having the position code 201 of "1100" are set in the ninth and 10th rows 1609 and 1610 in the intermediate table 16, as shown in FIG. 9.

The flow returns to step S8 again to check by looking up the position table 20 if a non-searched position code 201 which has the position code (="1100") set in the register SHO as the higher-level position code 203 is present.

In this case, since the corresponding position code 201 is not found (NO in step S9), the higher-level position code 203 of the position code (="1100") set in the register SHO is searched for by looking up the position table 20 (S11).

In this case, since the corresponding position code 201 (="1001") is found (YES in step S12), the position code 201 (="1001") is set in the register SHO (S13).

The flow returns to step S8 again to check if a non-searched position code 201 which has the position code (="1001") set in the register SHO as the higher-level position code 203 is present in the position table 20.

In this case, since the corresponding position code 201 is not found (NO in step S9), the higher-level position code 203 of the position code (="1001") set in the register SHO is searched for by looking up the position 10 table 20 (S11).

It is then determined that the column of the higher-level position code 203 of the position code (="1001") set in the register SHO is blank in the position table 20, i.e., no corresponding higher-level position code 203 is present (NO in step S12), thus ending processing.

with the above-mentioned processing, the intermediate table 16 shown in FIG. 9 is created.

As described above, with the intermediate table creation processing shown in the flow chart in FIG. 10, the intermediate table 16 is created in the following order with reference to the position table 20 and the employee master file 1.

① Data required for creating the organization table in association with a block 300 belonging to the highest hierarchical level (first hierarchical level) are created (S1 to S7).

With this processing, data associated with the block 300 (to be referred to as a block A hereinafter) of the wordprocessor division are created (corresponding to the first row 1601 in the intermediate table 16).

② Data required for creating the organization chart in association with the highest-level block belonging to the block 300 at the highest hierarchical level for which the data have been created in ① are created (S8→S10→S3 to S7).

With this processing, data associated with a block 300 (to be referred to as a block B hereinafter) of the engineering department which belongs to the wordprocessor division and is positioned at the second hierarchical level are created (corresponding to the second and third rows 1602 and 1603 in the intermediate table 16).

③ Data required for creating the organization chart in association with the highest-level block belonging to the block 300 for which the data have been created in ② are created (S8→S10→S3 to S7).

If other blocks 300 belonging to the same hierarchical level as that of the block in question in ③ are present, data required for creating the organization chart in association with these blocks 300 are created (repeat a series of processing in steps S8→S13→S8→ S10→S3 to S7 in correspondence with the number of corresponding blocks 300).

With this processing, blocks for creating the organization chart of a block 300 (to be referred to as a block C hereinafter) of the first engineering office and a block 300 (to be referred to as a block D hereinafter) of the second engineering office, which offices belong to the engineering department and are located at the third hierarchical level, are created (corresponding to the fourth to eighth rows 1604 to 1608 in the intermediate table 16).

④ Since the third hierarchical level corresponds to the lowest hierarchical level in this embodiment, it is checked again if a non-searched block 300 belonging to the block 300 at the highest hierarchical level is present. If such a block is found, data for creating the organization chart in association with the found block and all blocks 300 belonging to the found block 300 are created.

With this processing, data for creating the organization chart of a block 300 (to be referred to as a block E hereinafter) of the planning office which belongs to the wordprocessor division and is located at the third hierarchical level are created (corresponding to the ninth and 10th rows 1609 and 1610 in the intermediate table 16).

More specifically, the intermediate table creation processing shown in the flow chart in FIG. 10 will be explained with reference to FIG. 5 while taking the organization chart shown in FIG. 4 as an example. First, data associated with blocks 300-1 (wordprocessor division), 300-2-1 (engineering department), and 300-3-1 (first engineering office) are created along a path ①→②→③. After the control returns to the block 300-2-1 along a path ③→②, data associated with a block 300-3-2 (second engineering office) are created along a path ②→④.

After the control returns to the block 300-1 (wordprocessor division) along the path ④→②→①, data associated with a block 300-3-3 (planning office) are created along a path ①→⑥. After the control returns to the block 300-1 (wordprocessor division) along the path ⑥→①, since no path which is directed from the block 300-1 to lower hierarchical levels is present, the creation processing of the intermediate table 16 ends. The intermediate table 16 which is created as described above is written in the intermediate table file 6.

Next, processing wherein the hierarchical block development unit 8 develops (writes) image data of the organization chart onto the hierarchical image memory 11 using the intermediate table 16 created as described above and stored in the intermediate table file 6, and the intra-block arrangement definition table 7 set by the user will be described below.

The hierarchical block development unit 8 initializes a block column address (to be simply referred to as a column address hereinafter) m and a block row address (to be simply referred to as a row address hereinafter) n of the hierarchical image memory 11 to "1" and "0" (S21), respectively.

Of the blocks whose data are set in the intermediate table 16, the head block is designated (S22).

Thus, the block A (the first row 1601) in the intermediate table 16 shown in FIG. 9 is designated.

Subsequently, of the block name area 301 and the auxiliary name areas 302-1 to 302-6 of the block A, items defined by the intra-block arrangement definition table 7 (see FIG. 7) are extracted from the intermediate table 16 by looking up the definition table 7, and these extracted data are written at predetermined positions in the intra-block development memory 9 in accordance with the format shown in FIG. 6 (S23).

With this processing, "wordprocessor division" is set in the block name area 301, and "10 (inferiors)", "division manager", and "A" are set in the auxiliary name areas 302-2, 302-5, and 302-6, respectively.

It is checked if the hierarchical level of the currently designated block is larger than the value of the row address n (S24). If YES in step S24, the flow advances to step S30; otherwise, the flow jumps to step S25.

In this case, since the hierarchical level of the block A is "1", and the row address n is "0", the flow advances to step S25 to set the hierarchical level of the currently designated block in the row address n (s25).

With this processing, the row address n is updated to "1".

Subsequently, the contents (image data) of the intra-block development memory 9 are copied (transferred) to the area 1101 at an address (m, n) of the hierarchical image memory 11 (S26).

With this processing, print image data of the block A (wordprocessor division) is written in the area 1101 at the address (1, 1) of the hierarchical image memory 11.

After the contents of the intra-block development memory 9 are cleared (S27), the next block in the intermediate table 16 is designated (S28). If the next block is present (YES in step S29), the flow returns to step S23.

with this processing, the block B is designated as the next block.

Steps S23 to S26 described above are executed for the block B, and print image data of the block B (engineering department) is written in an area at an address (2,1) of the hierarchical image memory 11.

Subsequently, steps S27 to S29 S23 to S26 are executed, and print image data of the block C (first engineering office), in turn, is written in an area at an address (3, 1) of the hierarchical image memory 11.

Subsequently, steps S27 and S28 are executed again to designate the block D as the next block (S28). In step S25 executed before this step S28, "3" is designated in the row address n.

The flow returns to step S23, and print image data of the block D (second engineering office) is written in the intra-block development memory 9 in step S23.

It is then determined in step S24 that the hierarchical level (=2) of the block D as the designated block is smaller than the value (=3) of the current row address n (NO in step S24), and the flow jumps to step S30.

With the above-mentioned processing, print image data of the blocks A, B, and C are stored in the areas 1101 in the first row (n=1) to the third row (n=3) in the first column (m=1) of the hierarchical image memory 11.

After the column address m is incremented by "1" (S30), it is checked if the value m obtained by this increment falls within one page of a designated print paper sheet (S31). More specifically, in this embodiment, as shown in FIG. 8, the maximum value of the column address m is "5". For this reason, image data of a maximum of five blocks can be printed in the lateral direction on one page of the designated print paper sheet. In this manner, the processing in step S31 is executed to discriminate if block data for one page have been written.

At this time, since the value of the column address m is "2" (NO in step S31), it is checked if the hierarchical level of the currently designated block is equal to the value of the row address n (S32).

At this time, since the hierarchical level of the designated block D is "3" and the row address n is "3" (YES in step S32), it is checked if the higher hierarchical level of the designated block is equal to a value smaller by one than the value of the row address n (S33).

At this time, since the higher hierarchical level of the designated block D is "2", this value is equal to the value (n–1) (YES in step S33). For this reason, the flow returns to step S25 to execute the above-mentioned processing in steps S25 and S26.

with this processing, print image data of the block D is written in an area at an address (2, 3) of the hierarchical image memory 11.

Figure 12A:
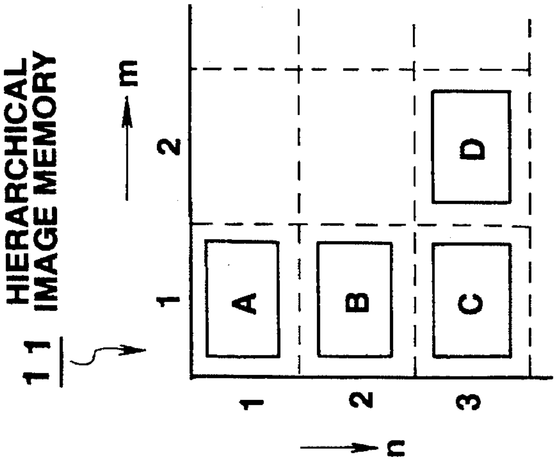
FIGS. 12A to 12C are views for explaining in detail development processing of print image data onto the hierarchical image memory.

With the operations described so far, print image data of the blocks A, B, C, and D are written in the hierarchical image memory 11 in the arrangement shown in FIG. 12A.

Then, the processing in steps S27 to S29 are executed to designate the block E as the next block in the intermediate table. Subsequently, the flow returns to step S23 to develop print image data of the block E onto the intra-block development memory 9. Thereafter, in step S24, the hierarchical level (="3") of the designated block E is compared with the value (="3") of the row address n set in step S25 in the previous loop, and the flow jumps to step S30.

Steps S30 and S31 are executed to increment the column address m by "1" (S31), and thereafter, it is determined in step S32 that the hierarchical level (="3") of the designated block E is equal to the value (="3") of the row address n (YES in step S32). Then, the discrimination in step S33 is executed.

Figure 12B:
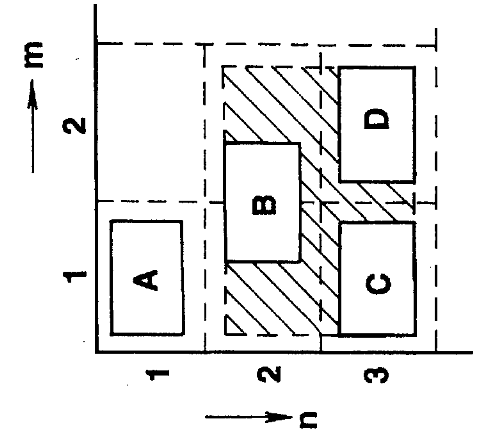

At this time, as shown in the intermediate table 16, since the higher-level position of the designated block E is "1" and the value (n–1) is "2" (NO in step S33), processing for centering and re-arranging the entire print image data of the blocks belonging to hierarchical levels from the (the higher hierarchical level of the designated block +1)-th hierarchical level to the (n–1)-th hierarchical level, which image data have already been developed in the hierarchical image memory 11, is performed for the hierarchical image memory 11 (S34).

with this operation, as shown in FIG. 12B, the print image data of the block B which belongs to the second hierarchical level is arranged at the middle position between the first column (m=1) and the second column (m=2).

Figure 12C:
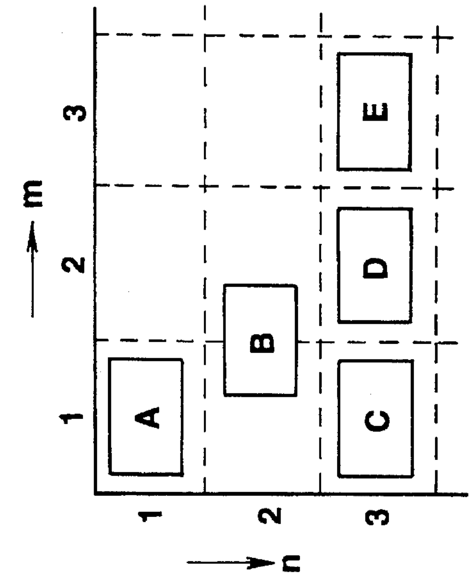

The flow returns to step S25 to set the hierarchical level (="3") of the designated block E in the row address n (S25), and thereafter, the print image data of the block E stored in the intra-block development memory 9 is copied (transferred) to an area 1101 at an address (3, 1) of the hierarchical image memory 11 (S26).

with the operations described so far, the print image data of all the blocks set in the intermediate table 16 are written in the hierarchical image memory 11, as shown in FIG. 12C.

Subsequently, after the contents of the intra-block development memory 9 are cleared in step S27, it is determined that a non-processed block does not remain in the intermediate table 16 (S28→S29; NO), and the flow jumps to step S37.

In step S37, all the print image data stored in the hierarchical image memory 11 are re-arranged so as to be arranged with good balance at the center of the page (see FIG. 4). After the re-arrangement, the contents of the hierarchical image memory 11 are transferred to the print image development unit 12 (S38), thus ending processing.

In this manner, the print image development unit 12 connects the block A and the blocks B and E, and the block B and the blocks C and D by ruled lines, and prints out the final image.

Figure 11:
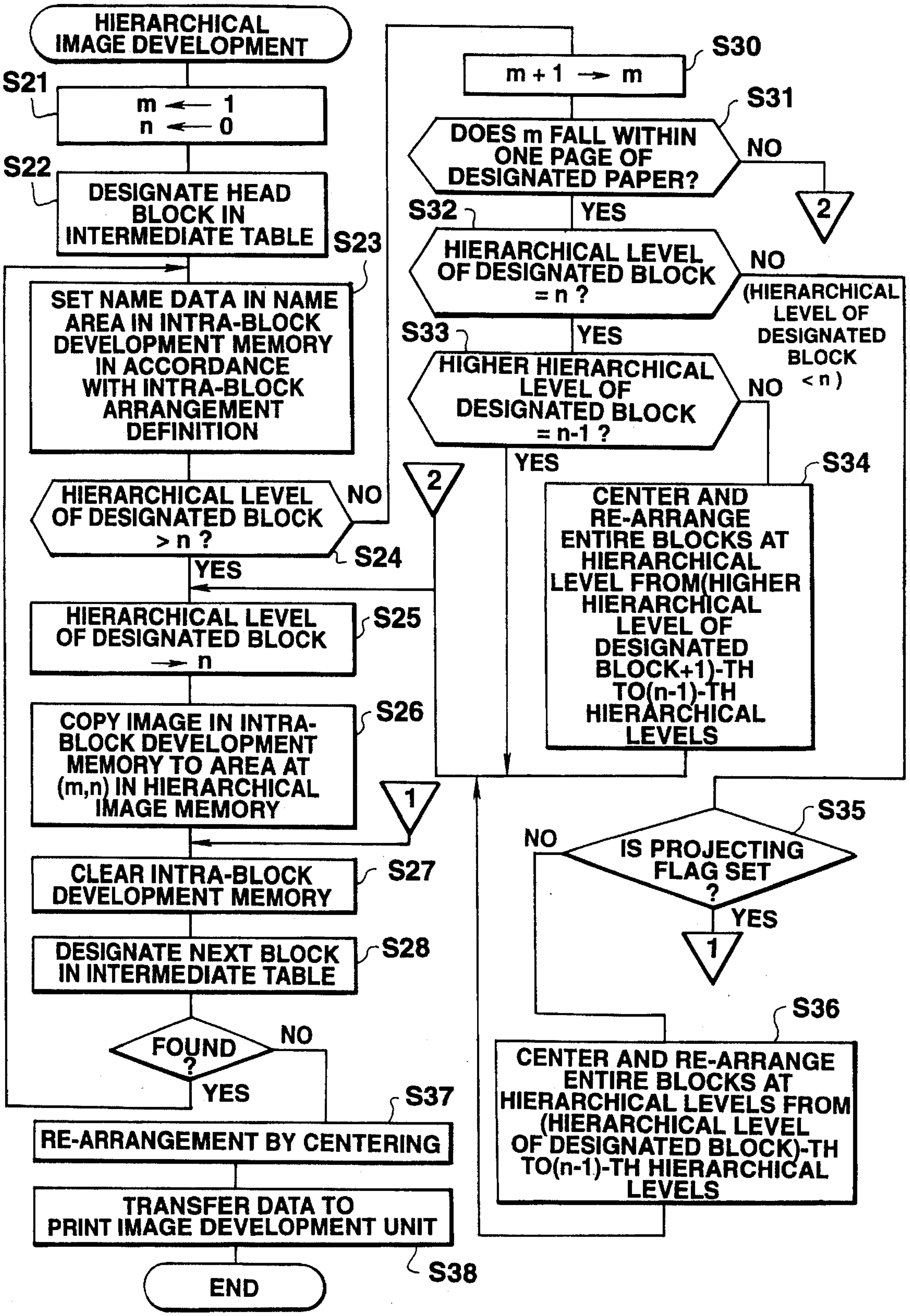
FIG. 11 is a flow chart for explaining development processing of print image data of an organization chart onto the hierarchical image memory by a hierarchical block development unit 8.

In the above-mentioned hierarchical image development processing shown in the flow chart in FIG. 11, when the hierarchical level of the block E is the second or first hierarchical level, NO is determined in step S32, and the flow advances to step S35.

In step S35, processing for discriminating if the projecting flag set in the position table file 2 is present in the intermediate table 16, as will be described later, is executed. 10 In this case, since no projecting flag is present (NO in step S35), the flow advances to step S36. Step S36 corresponds to step S34 described above, and is executed when the hierarchical level of the currently designated block (in this case, the block E) is higher than that of the previously designated block (in this case, the block D).

In step S36, re-arrangement processing for centering print image data of blocks belonging to hierarchical levels from the hierarchical level of the designated block to the (n−1)-th hierarchical level of the blocks written in the hierarchical image memory 11 so far is executed.

Figure 13A:
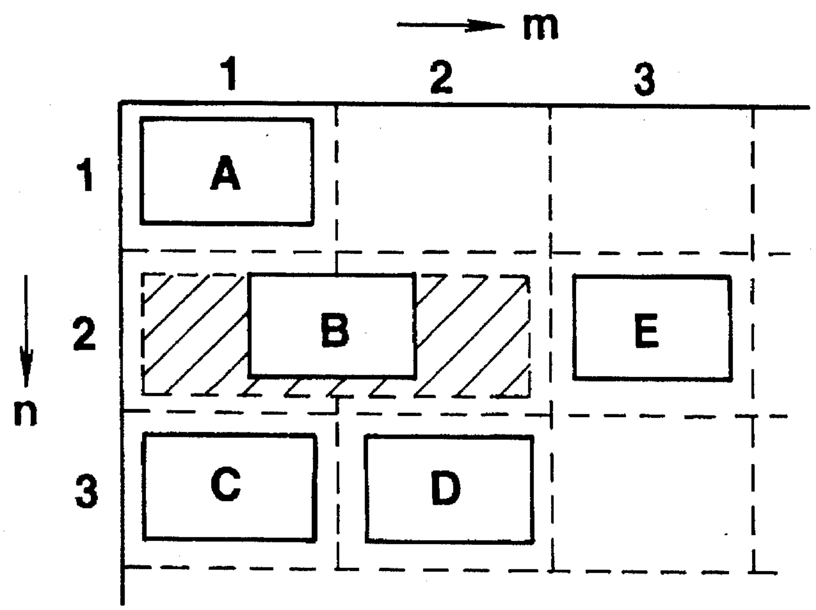
FIGS. 13A and 13B are views for explaining a difference in centering/re-arrangement processing when a block E belongs to different hierarchical layers.
Figure 13B:
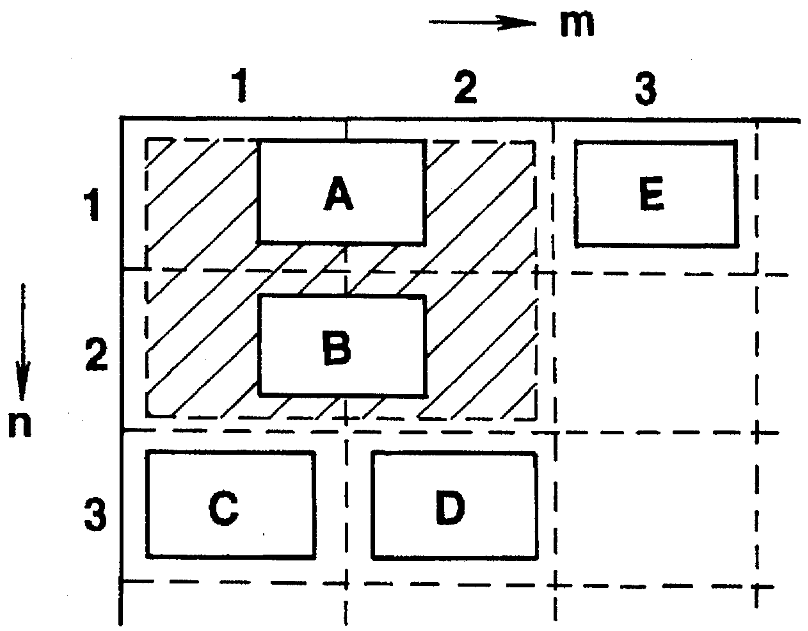

For example, in the same manner as in FIGS. 12A to 12C, when the print image data of the blocks A, B, C, and D are created in the state shown in FIG. 12A, the row address n is "3". Therefore, when the block E corresponds to the second hierarchical level, only the print image data of the block B at the second hierarchical level is subjected to centering processing, as shown in FIG. 13A. On the other hand, when the block E corresponds to the first hierarchical level, print image data of the block A at the first hierarchical level and the block B at the second hierarchical level are subjected to centering processing, as shown in FIG. 13B.

As described above, when the hierarchical level of a block for which print image data is newly created is higher than the block for which print image data was created in the previous processing, print image data of the already created blocks which have hierarchical levels lower than that of the block for which print data is newly created and require centering are subjected to the centering processing.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for printing out an organization chart image on the basis of a data file and a position table, comprising the steps of:

storing a plurality of data in the data file, and storing a position code in correspondence with each of the stored data;

storing a plurality of position codes in the position table, and storing a higher-level connection code indicating a connection to a higher-level connection code and a hierarchical level number indicating a higher hierarchical level in correspondence with each of the position codes;

classifying the data stored in the data file into blocks in units of corresponding position codes;

generating a position name indicating the position code of a block of interest and data included in the block as a block image for each of the classified blocks;

arranging the block image generated for each of the classified blocks in a hierarchical area corresponding to the hierarchical level number of the block when the block image is developed in an image memory which is divided into a plurality of hierarchical areas, and arranging blocks having the common higher-level connection code at neighboring positions upon arrangement of the block images;

correcting the arrangement position of the block image arranged in the higher-level hierarchical area of the blocks which have the common higher-level connection code and are arranged at the neighboring positions, so that the block image in the higher-level hierarchical area is arranged at a middle position between the block images of the blocks having the common higher-level connection code; and connecting the hierarchical levels of block images arranged in the corresponding hierarchical areas in the image memory by connection line images, and printing out an image obtained by connecting the block images connected by the connection line images as an organization chart image.

2. A print method for an organization chart image in a processing apparatus provided with an employee data file for storing a plurality of employee data, and storing title data and a position code in correspondence with each of the employee data; a position table for storing a plurality of position codes, and storing a higher-level position code and a hierarchical level number of the hierarchical level in correspondence with each of the position codes; and an image memory on which image data is developed, said method comprising the steps of:

classifying the employee data stored in the employee data file into blocks in units of corresponding position codes;

generating a position name indicating the position code of a block of interest and employee data included in the block as a block image together with title data of the employee data for each of the classified blocks;

arranging the block image generated for each of the classified blocks in a hierarchical area corresponding to the hierarchical level number of the block when the block image is developed in the image memory, and arranging blocks having the common higher-level connection code at neighboring positions upon arrangement of the block images; and connecting the hierarchical levels of block images arranged in the corresponding hierarchical areas in the image memory by connection line images, and printing out an image obtained by connecting the block images connected by the connection line images as an organization chart image.

3. An image print method in an image processing apparatus which comprises an image memory for storing a plurality of image blocks in a predetermined arrangement, said method comprising the steps of:

storing the plurality of image blocks in block storage means;

arranging a first image block of the plurality of image blocks in a first hierarchical area allocated in the image memory;

arranging, in a line, a plurality of lower-level image blocks which commonly have the first image block as a higher-level block in a direction parallel to the first image block in a second hierarchical area adjacent to the first hierarchical area in the image memory;

re-arranging the first image block at a middle position between the arrangement positions of the lower-level image blocks and in the first hierarchical image area in the image memory after the lower-level image blocks are arranged; and connecting the hierarchical levels of the re-arranged image blocks in the image memory by connection line images, and printing out an image chart of the connected images.

* * * * *